United States Patent

[11] 3,615,336

| [72] | Inventors | Rene Collard<br>Morlanwelz-Mariemont;<br>Georges Thyoux, Soignies, both of Belgium |
|---|---|---|
| [21] | Appl. No. | 791,560 |
| [22] | Filed | Jan. 16, 1969 |
| [45] | Patented | Oct. 26, 1971 |
| [73] | Assignee | Owens-Illinois, Inc. |

[54] GLASS FORMING APPARATUS WITH ARTICLE SUPPORT
4 Claims, 5 Drawing Figs.

[52] U.S. Cl. .................................................. 65/260,
65/306, 65/323, 65/359, 65/360
[51] Int. Cl. .................................................. C03b 9/04,
C03b 9/00
[50] Field of Search .................................................. 65/361,
359, 360, 357, 323, 260, 306

[56] References Cited
UNITED STATES PATENTS

| 646,948 | 4/1900 | Brookfield et al. | 65/360 |
|---|---|---|---|
| 1,842,279 | 1/1932 | Nelson, Jr. | 65/361 X |
| 1,856,577 | 5/1932 | McLaughlin | 65/360 |
| 2,949,701 | 8/1960 | Olson et al. | 65/361 X |
| 3,251,673 | 5/1966 | Brymer, Jr. | 65/361 X |
| 3,268,322 | 8/1966 | Denman | 65/361 X |
| 3,278,290 | 10/1966 | Rowe | 65/361 X |
| 3,472,639 | 10/1969 | Mumford | 65/359 X |
| 3,490,891 | 1/1970 | Fouse | 65/361 X |

*Primary Examiner*—Frank W. Miga
*Attorneys*—Richard B. Dence and E. J. Holler

ABSTRACT: A glass forming apparatus comprising a mold with three separable sections including a fixed first section having mold cavities in opposed vertical faces thereof and a pair of horizontally separable second sections mounted in movable relation on the sides of said first section, each section having a mold cavity complemental to and facing the juxtaposed cavity of the first section.

PATENTED OCT 26 1971　　　　　　　　　　3,615,336

INVENTORS
RENÉ COLLARD
GEORGES THYOUX
BY Richard B. Dence &
E. J. Holler
ATTORNEYS

3,615,336

GLASS FORMING APPARATUS WITH ARTICLE SUPPORT

This invention relates to glass forming apparatus.

BACKGROUND OF THE INVENTION

In the forming of glass articles by pressing, for example, wherein a foot is pressed on a previously formed hollow glass article to form stemware and the like, one of the primary considerations in increasing efficiency in production is that the glass article must be retained in the mold for sufficient time to permit the article to set to a condition wherein it can be handled. One of the methods utilized for increasing production is to provide a plurality of stations. This obviously necessitates a substantially greater cost in the rebuilding of an entire machine coupled with the increased cost of the larger machines. Another method of increasing production capacity is to increase the number of stations, for example, in a rotary table machine. This increases the speed but decreases the time allowed for pressing.

Among the objects of the present invention are to provide an apparatus for increasing the capacity of glass forming equipment wherein there are limitations as to cooling time, pressing time and capacity of the drive mechanism; which apparatus can be adapted to existing mechanisms.

SUMMARY OF THE INVENTION

A glass forming apparatus comprising a mold with three separable sections including a fixed first section having mold cavities in opposed vertical faces thereof and a pair of horizontally separable second sections mounted in movable relation on the sides of said first section, each section having a mold cavity complemental to and facing the juxtaposed cavity of the first section.

DESCRIPTION

The invention is described in connection with a machine of the type shown in the U.S. Pat. No. to Schutz 2,327,825 wherein articles that have previously been blown are held in position and a charge of glass is delivered to one end of the article and pressed into position to form a foot on the article resulting in a glass article such as an article of stemware.

Figure 1:
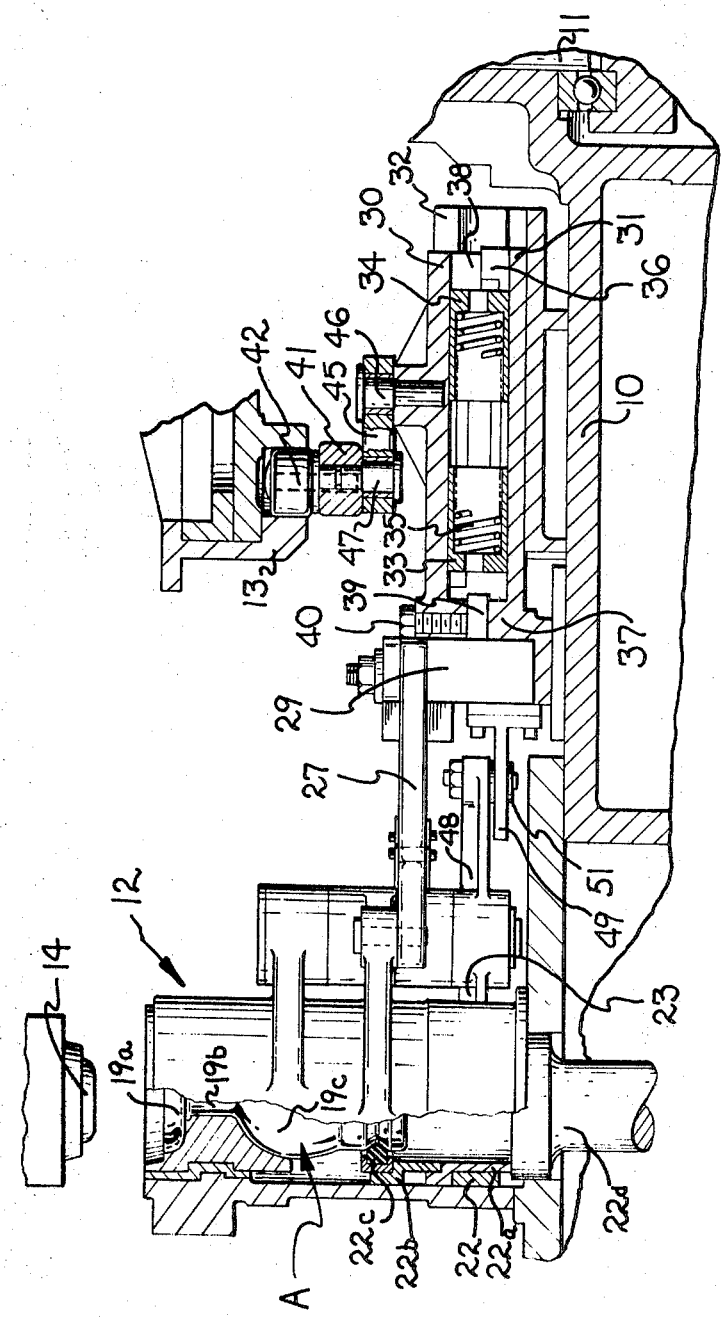
FIG. 1 is a part sectional vertical view of a portion of the machine embodying the invention.
Figure 2:
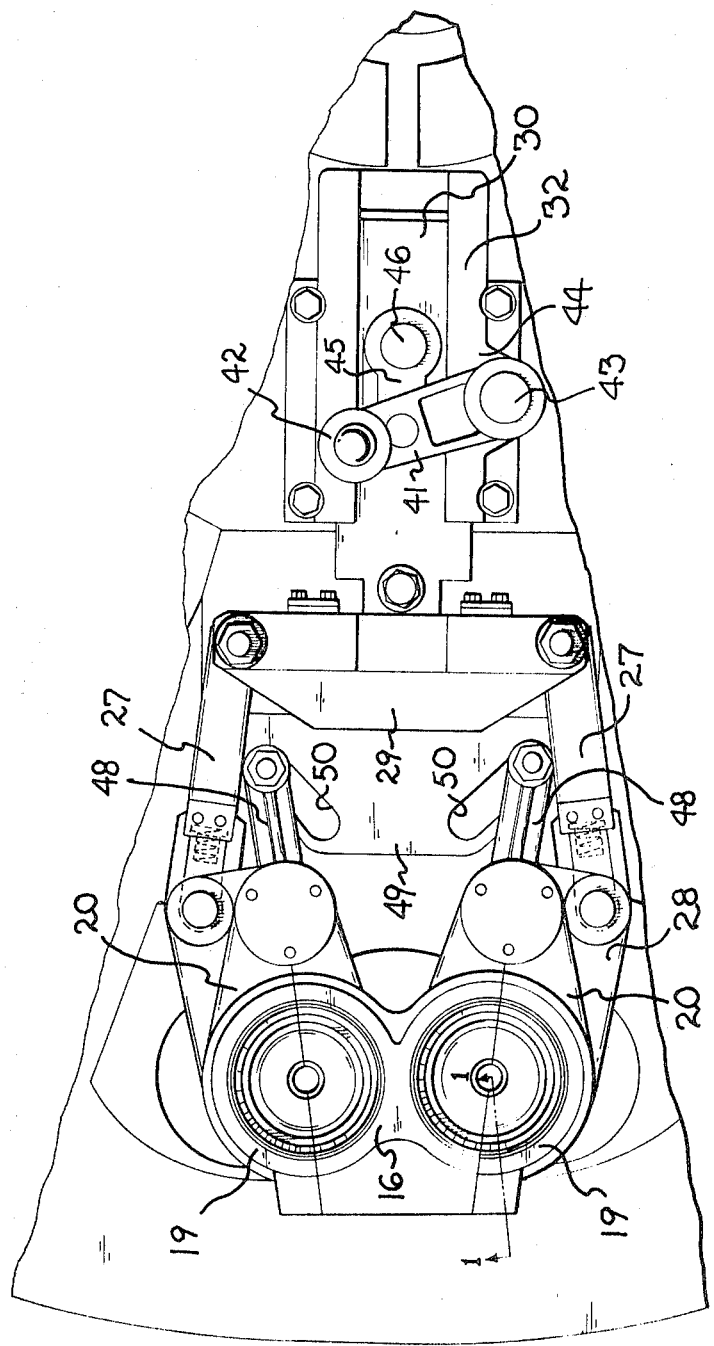
FIG. 2 is a plan view of the same.

Referring to FIGS. 1 and 2, such a machine comprises a rotatable table 10 mounted on a stationary column 11 and supporting a plurality of mold assemblies 12 that are periodically opened and closed by a stationary cam 13. As the table 10 is rotated, each mold assembly is opened and an article is placed in position. The molds are then closed and moved to another station wherein a charge of glass is fed to the upper end of the molds. The mold assemblies are further moved to another station where a plunger 14 is moved downwardly to form a foot and join the foot to the previously formed article in the mold.

Figure 3:
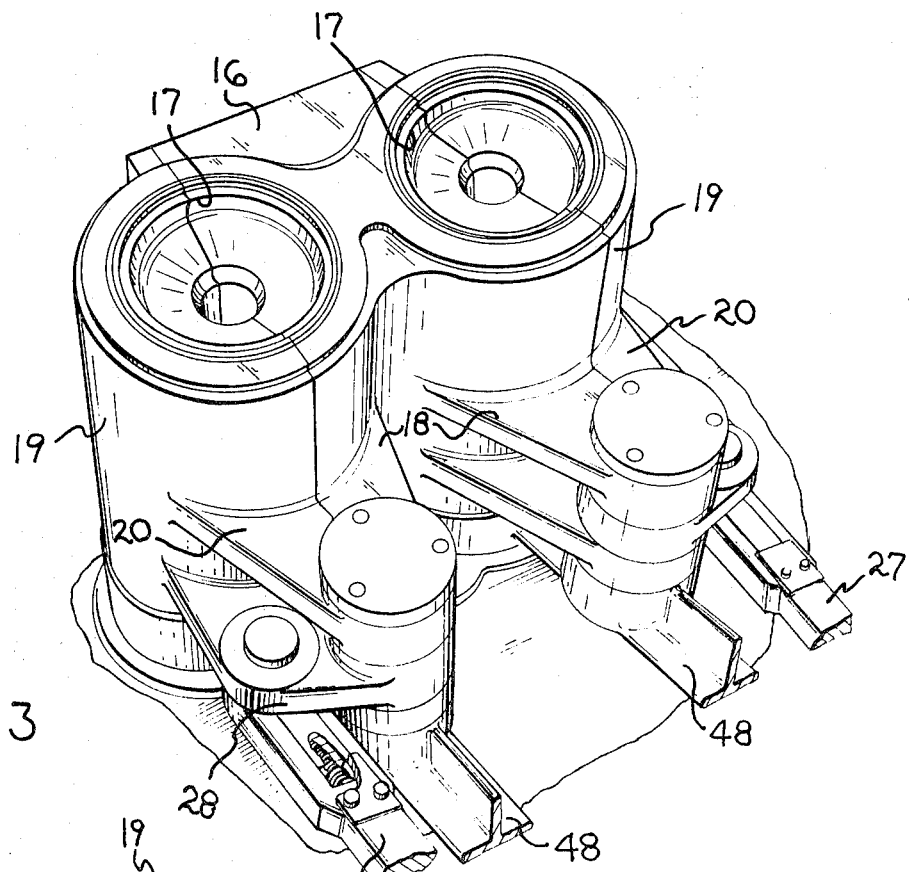
FIG. 3 is a fragmentary perspective view of a portion of the machine.
Figure 4:
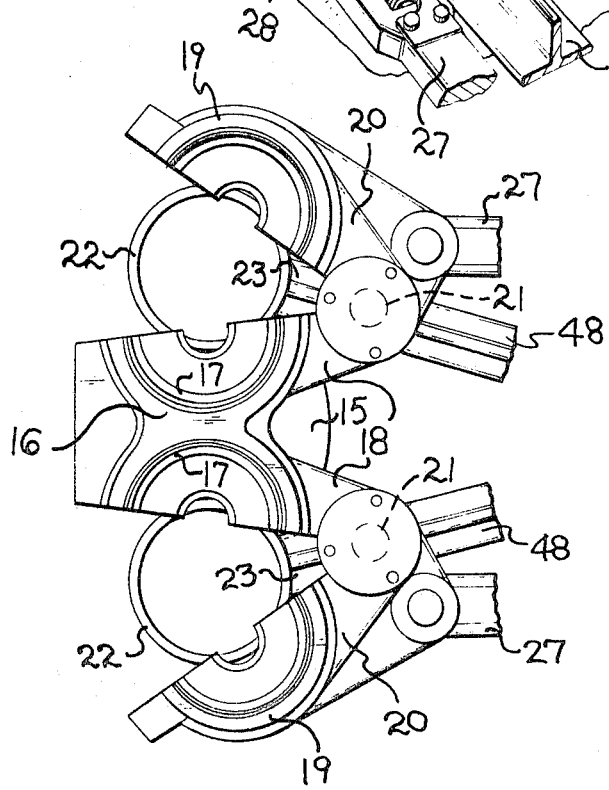
FIG. 4 is a fragmentary plan view of portions of the machine shown in FIG. 2 showing the parts in a different operative position.

Referring to FIGS. 3 and 4, each mold assembly 12 comprises a base 15 fixed to the rotary table 10 and supporting a center stationary first mold member or section 16 having opposed surfaces 17, each of which defines a portion of a mold cavity. The section 16 includes rearwardly extending flanges 18 on which second mold halves or sections 19 are supported by mold carriers 20 pivoted to the flanges 18 by pins 21.

The mold halves 19 are complementary to the surfaces 17 so that when the mold halves are moved toward the center section 16, two mold cavities are provided. Each mold cavity includes an upper foot shaping portion 19a, an intermediate stem shaping portion 19b, and a bowl receiving portion 19c.

A ring 22 is also supported on each pin 21 by means of integral bracket 23 which is adapted to support the glass article on which the foot is to be pressed before the molds are closed and after they are opened. Each ring 22 supports vertically telescoping members 22a, 22b, the latter, in turn, supporting a gripping ring 22c. In practice, a previously shaped article with a stem is placed on the gripping ring 22c. After the molds are closed, a plunger 22d is actuated to elevate the article and hold it in position against the surfaces of the mold cavity for receiving the charge of glass which is to be formed into a foot.

Referring to FIGS. 1 and 2, the linkage for opening and closing the mold halves comprises links 27 pivoted to flanges 28 on the mold carriers at one end and to a yoke 29 at the other. A pair of slide bars 30, 31 are mounted for sliding movement radially of the mold table in a guiding frame 32 secured to the table. One of the slide bars 31 is formed integrally with the yoke. The two slide bars provide a guideway in which slide blocks 33, 34 are mounted, the blocks 33, 34 being formed with sockets to receive the ends of a coil spring 35 which is placed under compression between the blocks. The slide bar 31 is formed at its inner end with stop lugs 36 which project upwardly behind the block 34. The outer slide block 33 engages stop lugs 37 formed on the yoke. The upper slide bar 30 is formed at its inner end with depending lugs 38 which engage behind the block 34. The bar 30 carries at its outer end a stop 39 in the path of a stop in the block. The stop 39 is adjustable and held in adjusted position by a setscrew 40. Movement is imparted to the upper slide bar 30 through a lever 41 carrying a cam roll 42 running in the cam 13. The other end of the lever 41 is mounted on a pivot pin 43 mounted on a lug 44 on the guide frame 32. A link 45 connected at one end by a pivot pin 46 to the slide bar 30 and connected at its other end by a pivot pin 47 to the lever 41 provides an operating connection between the lever 41 and the slide bar 30.

Movement of the cam roll 42 in the cam 13 thus functions to open and close the mold sections.

Means are provided for moving the article supports or rings 22 to an intermediate position between the first section 16 and the second sections or mold halves 19 when the mold halves are open. Specifically, this comprises an arm 48 which is fixed on each bracket 23 and extends toward the yoke 29. A plate 49 extends from the yoke 29 toward the mold and has a pair of diagonal slots 50 therein in which rollers 51 on the ends of arm 48 extend. When the yoke 29 is moved away from the mold to open the mold halves 19, the arms 48 are swung inwardly to move the article supports or rings 22 to an intermediate position, as shown in FIG. 4.

In practice, a previously formed hollow glass article in the form of a bowl is placed in inverted position on each support ring 22c which, in turn, is seated, as shown, in member 22b and the molds are closed. Plunger 22d is actuated to move the bowl upwardly in each mold cavity and a charge of glass is delivered to the foot shaping portion 19a. Plunger 14 is thereafter lowered to press and shape the charge of glass to the configuration of the stem shaping portion 19b and the foot shaping portion 19a and concurrently join the so-formed stem portion to the bowl. Thereafter, each plunger is elevated or retracted, as shown in FIG. 1, leaving the resultant footed stemware or article A ready for removal from each mold 19.

We claim:

1. An apparatus for simultaneously press forming a pair of glass articles comprising
   a mold consisting of at least three separable sections including
   a fixed first section having mold cavities in opposing vertical faces, means for mounting said first sections in fixed position,
   a pair of horizontally separable second sections mounted for movement toward and away from the sides of said first section, each second section having a mold cavity complemental to and facing a cavity of said first section, each said cavity having an upper foot shaping portion, an intermediate shaping portion, and a lower bowl shaping portion, means for supporting said second sections for movement toward and away from the vertical faces of said first section, an article support individual to each said second section on which the article is adapted to be supported, means for supporting each said article support for movement between a position within its respective mold cavity when its respective second section is adjacent said first section and an intermediate position between said first mold section and its respective second mold section when said second mold section is moved away from said first mold section, means for moving said second sections toward and away from said first section, means for connecting each article support to said means for moving said second sections for moving each said article support outwardly in the general direction of movement of its respective said second section away from said first mold section to an intermediate position between said first mold section and said second mold section when said second mold sections are moved away from said first mold section.

2. The combination set forth in claim 1 wherein said means for moving said second sections toward and away from said first section comprises a reciprocable yoke and links interconnecting said second sections and said yoke.

3. The combination set forth in claim 2 wherein said means for moving said article supports comprises a member mounted on and movable with said yoke, means interconnecting said article supports and said member operable to move said article supports during reciprocating movement of said yoke.

4. The combination set forth in claim 3 wherein each said second section is pivotally mounted for movement with respect to said first section, each said article support is pivotally mounted about the same pivotal axis as its respective second section for movement with respect to said first section and said second sections.